No. 828,812. PATENTED AUG. 14, 1906.
H. BRINKHAUS.
PINCE NEZ EYEGLASSES.
APPLICATION FILED JULY 6, 1905.
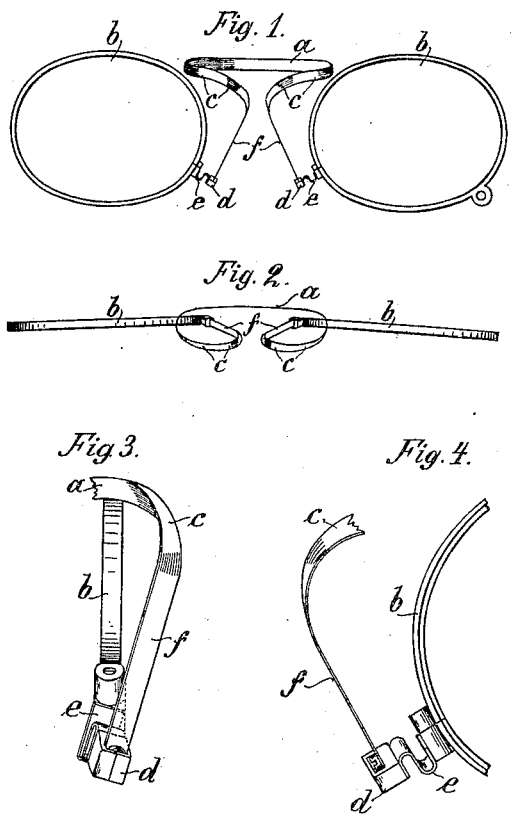
Witnesses: Inventor:
Dorothea Gilsow Hugo Brinkhaus
Walter Brunton

UNITED STATES PATENT OFFICE.

HUGO BRINKHAUS, OF BERLIN, GERMANY.

PINCE-NEZ EYEGLASSES.

No. 828,812.  Specification of Letters Patent.  Patented Aug. 14, 1906.

Application filed July 6, 1905. Serial No. 268,309.

*To all whom it may concern:*

Be it known that I, HUGO BRINKHAUS, doctor of medicine, a citizen of the United States, residing at Berlin, Germany, have invented certain new and useful Improvements in the Construction of What are Commonly Known as "Pince-Nez Eyeglasses;" and I do hereby declare the following to be a full, clear, and exact description of the invention, such as will enable others skilled in the art to which it appertains to make and use the same, reference being had to the drawings and the letters thereon.

Figure 1 represents a front view of a pair of eyeglasses (that side which is turned toward the eyes of the individual having the glasses upon the nose) mounted in accordance with my invention; Fig. 2, a top view of eyeglasses at an angle; Fig. 3, the improved spring in its position relative to the glasses as seen from a vertical line which divides the eyeglasses in two halves; Fig. 4, a portion of Fig. 1, on a larger scale, showing connecting-piece $e$.

The improvement consists in the following features: The spring $a$, $c$, and $f$ is spring and nose guards in one. The construction is thereby much simplified. There being only one fastening place on the glass or its rim on the inner side, the contour of the glass may be held free from interruptions, which is an advantage not only from an esthetical point of view, but also for the sight, since all interruptions along the border line of the glass act upon nervous people as a fly would riding on the frame of the eyeglasses. The parts $a$ and $c$ by their standing on edge, which is preferred, although not a necessity, secure rigidity sufficient to maintain the glasses when once correctly adjusted in their original position. The part $f$ of the spring may be overlaid with cork or any suitable material and forms a nose-guard that is most efficient, since $f$, which holds onto the sides of the nose, is most efficiently assisted by parts $c$, which enter the orbital cavity, leaning against the upper and inner wall. A pressure exerted upon the projecting portion $c$ of the spring by the muscular tissue surrounding the orbital cavity holds the eyeglasses absolutely under control, since it presses them in downward direction where the sides $f$ engage the wedge-shaped nose, which resists the descent of the eyeglasses. Connecting part $e$ is of such form that a pair of pincers will readily alter the same into a more or less stretched shape, thereby correcting the intercentral distance of the glasses, as also the axial direction of cylinders to suit individual cases. The springs are made of different sizes to fit the different noses. Stud $d$ is so fastened in its relative position to the glass that its sides lie not parallel with the plane of the glass, but deviate more or less from parallel lines, so as to give the spring the correct positions between the glasses for the purpose of obtaining the best grasp on the parts of nose and orbit with the least possible pressure.

Having thus fully described my invention, I claim the following features as my invention, which I desire to secure by Letters Patent:

1. In eyeglasses, the combination of lenses with a spring member, comprising an upper portion curved in a horizontal plane forming the bridge, and portions extending rearwardly and downwardly forming nose-guards, and means for attaching said spring members to said lenses.

2. In eyeglasses, the combination of lenses with a spring member, comprising an upper portion curved in a horizontal plane forming the bridge, and portions extending, rearwardly and downwardly, forming nose-guards and means for attaching the ends of said spring members to said lenses.

3. In eyeglasses, the combination of lenses with a spring member comprising an upper portion curved in a horizontal plane in front of the lenses and forming the bridge and portions extending rearwardly and downwardly therefrom, forming nose-guards, and means both for attaching said nose-guards to said lenses, and for extending or shortening the space between the lenses.

4. In eyeglasses, the combination with the lenses of a flat spring member comprising a portion lying in a vertical plane forming the bridge, and portion extending rearwardly and downwardly therefrom, said downwardly-extending portions lying in planes at right angles to the bridge portions and forming nose-guards, and means for attaching the ends of said spring members to said lenses.

5. In eyeglasses, the combination with the lenses of a flat spring member comprising a portion lying in a vertical plane in front of the lenses and forming the bridge, and portions extending rearwardly and downwardly therefrom, said downwardly-extending portions lying in planes at right angles to the bridge portions and forming nose-guards and means for attaching the ends of said spring members to said lenses.

In witness whereof I have hereunto signed my name, this 24th day of June, 1905, in the presence of two subscribing witnesses.

HUGO BRINKHAUS.

Witnesses:
 DOROTHEA GÜLSOW,
 WALTER BRENTON.